US012645951B2

(12) United States Patent
Eto et al.

(10) Patent No.: US 12,645,951 B2
(45) Date of Patent: Jun. 2, 2026

(54) LEARNING DEVICE, LEARNING METHOD, AND LEARNING PROGRAM

(71) Applicant: NEC Corporation, Tokyo (JP)

(72) Inventors: Riki Eto, Tokyo (JP); Yuki Nakaguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1062 days.

(21) Appl. No.: 17/637,138

(22) PCT Filed: Aug. 29, 2019

(86) PCT No.: PCT/JP2019/033864
§ 371 (c)(1),
(2) Date: Feb. 22, 2022

(87) PCT Pub. No.: WO2021/038781
PCT Pub. Date: Mar. 4, 2021

(65) Prior Publication Data
US 2022/0343180 A1     Oct. 27, 2022

(51) Int. Cl.
*G06N 5/00* (2023.01)
*G06F 18/21* (2023.01)
*G06F 18/214* (2023.01)
*G06N 5/01* (2023.01)

(52) U.S. Cl.
CPC ............. *G06N 5/01* (2023.01); *G06F 18/214* (2023.01); *G06F 18/217* (2023.01)

(58) Field of Classification Search
None
See application file for complete search history.

(56) References Cited

U.S. PATENT DOCUMENTS

| 10,387,463 | B2 * | 8/2019 | Campbell | ............. | G10L 15/063 |
| 10,896,383 | B2 * | 1/2021 | Uchibe | ................. | G06N 20/00 |
| 10,963,313 | B2 * | 3/2021 | Nag | ........................ | G06N 20/00 |
| 11,586,974 | B2 * | 2/2023 | Isele | ........................ | G06N 20/00 |

(Continued)

FOREIGN PATENT DOCUMENTS

| JP | 2013-225192 A | 10/2013 |
| JP | 2014-524063 A | 9/2014 |

(Continued)

OTHER PUBLICATIONS

JP Office Action for JP Application No. 2021-541890, mailed on Apr. 11, 2023 with English Translation.

(Continued)

*Primary Examiner* — Maikhanh Nguyen
(74) *Attorney, Agent, or Firm* — Sughrue Mion, PLLC

(57) ABSTRACT

A reward function estimation unit 81 estimates a reward function by multiple importance sampling using samples of a decision-making history of a subject and of a decision-making history generated based on a sampling policy. A policy estimation unit 82 estimates a policy by reinforcement learning using the estimated reward function. The reward function estimation unit 81 sets the policy estimated by the policy estimation unit as a new sampling policy, and estimates the reward function by the multiple importance sampling using the samples of the decision-making history of the subject and of the decision-making history generated based on the sampling policy.

11 Claims, 4 Drawing Sheets

(56) References Cited

U.S. PATENT DOCUMENTS

| | | | |
|---|---|---|---|
| 11,651,208 B2* | 5/2023 | Xu | G06N 3/08 |
| | | | 706/25 |
| 2016/0196492 A1 | 7/2016 | Johnson et al. | |
| 2017/0117744 A1* | 4/2017 | Ye | H10F 77/955 |
| 2017/0147949 A1* | 5/2017 | Uchibe | G06N 20/00 |
| 2018/0165603 A1* | 6/2018 | Van Seijen | G06N 3/045 |
| 2019/0012371 A1* | 1/2019 | Campbell | G06F 16/3329 |
| 2019/0147355 A1* | 5/2019 | Rennie | G06N 3/044 |
| | | | 706/47 |
| 2020/0065157 A1* | 2/2020 | Nag | G06N 7/01 |
| 2020/0090074 A1* | 3/2020 | Isele | G06N 20/00 |
| 2020/0175364 A1* | 6/2020 | Xu | G06N 3/045 |
| 2020/0265302 A1* | 8/2020 | Sanyal | G06N 3/045 |
| 2020/0382388 A1* | 12/2020 | Parthasarathy | H04L 41/5051 |

FOREIGN PATENT DOCUMENTS

| | | |
|---|---|---|
| JP | 2017-527022 A | 9/2017 |
| WO | 2017/159126 A1 | 9/2017 |

OTHER PUBLICATIONS

International Search Report for PCT Application No. PCT/JP2019/033864, mailed on Nov. 5, 2019.

English translation of Written opinion for PCT Application No. PCT/JP2019/033864, mailed on Nov. 5, 2019.

Metelli, Alberto Maria et al., "Policy Optimization via Importance Sampling", arXiv[online], Oct. 31, 2018, pp. 1-30, [retrieved on Oct. 28, 2019], Internet <URL:https://arxiv.org/pdf/1809.06098.pdf>.

* cited by examiner

LEARNING DEVICE, LEARNING METHOD, AND LEARNING PROGRAM

This application is a National Stage Entry of PCT/JP2019/033864 filed on Aug. 29, 2019, the contents of all of which are incorporated herein by reference, in their entirety.

TECHNICAL FIELD

The present invention relates to a learning device, a learning method and a learning program for performing inverse reinforcement learning.

BACKGROUND ART

In recent years, the technology to automatically formulate and mechanize optimal decision making in various tasks has become more important. In general, in order to make optimal decisions, the optimization target is formulated as a mathematical optimization problem, and the optimal action is determined by solving the problem. In this case, the formulation of the mathematical optimization problem is the key, but it is difficult to formulate it manually. Therefore, attempts are being made to further develop the technology by simplifying this formulation.

Inverse reinforcement learning is known as one of the methods to formulate mathematical optimization problems. Inverse reinforcement learning is a method of learning an objective function (reward function) that evaluates the action of each state based on the history of decision making of an expert. In inverse reinforcement learning, the objective function of an expert is estimated by updating the objective function so that the history of decision making is closer to that of the expert.

In inverse reinforcement learning, learning is usually performed using the decision-making history of an expert, a simulator or actual machine that represents the state of a machine when it is actually operated, and a state transition (prediction) model that represents the predicted transition destination according to the state.

First, an initial value of the reward function is set, and then a decision-making simulation using this reward function is performed. Specifically, as the decision-making simulation based on reinforcement learning, an optimization calculation is performed to determine a policy using a state transition model, a reward function, and a simulator, and a decision-making history is determined as a history of states and action output based on the policy. The optimal control may be executed as this decision-making simulation. The reward function is updated in order to reduce a difference between the decision-making history based on the reward function and the decision-making history of the expert. Then, the decision-making simulation is performed using updated reward function to determine the decision-making history, and the reward function is updated in the same manner. By repeating the above process, the reward function of the expert is estimated so that the difference between the reward function and the decision-making of the expert is eliminated.

On the other hand, it is generally difficult to refine the state transition model. Therefore, a method of model-free inverse reinforcement learning has been proposed, in which a reward function can be estimated without using the state transition model. For example, patent literature 1 describes a model-free inverse reinforcement learning method. In the method described in patent literature 1, there is no need to know in advance environmental dynamics which is a mathematical model of the control object. Therefore, the effect of errors in modeling can be eliminated, and furthermore, since the optimization calculation to determine a policy during learning described above is no longer necessary, computational costs can be reduced.

CITATION LIST

Patent Literature

PTL 1: International Patent Publication No. 2017/159126

SUMMARY OF INVENTION

Technical Problem

As a method of model-free inverse reinforcement learning is relative entropy inverse reinforcement learning. The relative entropy inverse reinforcement learning is a method that can learn a reward function model-free by using sampling from a decision-making history with random policies. However, since the relative entropy inverse reinforcement learning uses importance sampling based on the random policy, the learning of the reward function becomes inefficient when the action space becomes high-dimensional.

Although patent literature 1 describes model-free inverse reinforcement learning, the specific learning method is not explicitly described, and such sampling problem is not considered. Therefore, in relative entropy inverse reinforcement learning which can achieve model-free learning, it is desirable to be able to suppress the variance of estimates to suppress deterioration of the learning efficiency even when the sampling space is high-dimensional.

Therefore, it is an exemplary object of the present invention to provide a learning device, a learning method, and a learning program capable of suppressing deterioration of the learning efficiency when performing relative entropy inverse reinforcement learning.

Solution to Problem

A learning device according to the exemplary aspect of the present invention includes a reward function estimation unit which estimates a reward function by multiple importance sampling using samples of a decision-making history of a subject and of a decision-making history generated based on a sampling policy, and a policy estimation unit which estimates a policy by reinforcement learning using the estimated reward function, wherein the reward function estimation unit sets the policy estimated by the policy estimation unit as a new sampling policy, and estimates the reward function by the multiple importance sampling using the samples of the decision-making history of the subject and of the decision-making history generated based on the sampling policy.

A learning method according to the exemplary aspect of the present invention includes estimating a reward function by multiple importance sampling using samples of a decision-making history of a subject and of a decision-making history generated based on a sampling policy, estimating a policy by reinforcement learning using the estimated reward function, and setting the estimated policy as a new sampling policy, and estimates the reward function by the multiple importance sampling using the samples of the decision-making history of the subject and of the decision-making history generated based on the sampling policy.

A learning program according to the exemplary aspect of the present invention causes a computer to execute a reward function estimation process of estimating a reward function by multiple importance sampling using samples of a decision-making history of a subject and of a decision-making history generated based on a sampling policy, and a policy estimation process of estimating a policy by reinforcement learning using the estimated reward function, wherein the learning program causes the computer to set the policy estimated by the policy estimation unit as a new sampling policy, and estimate the reward function by the multiple importance sampling using the samples of the decision-making history of the subject and of the decision-making history generated based on the sampling policy, in the reward function estimation process.

Advantageous Effects of Invention

According to the exemplary aspect of the present invention, it is possible to suppress deterioration of learning efficiency when performing relative entropy inverse reinforcement learning.

DESCRIPTION OF EMBODIMENTS

Hereinafter, an exemplary embodiment of the present invention will be described with reference to the drawings.

Figure 1:
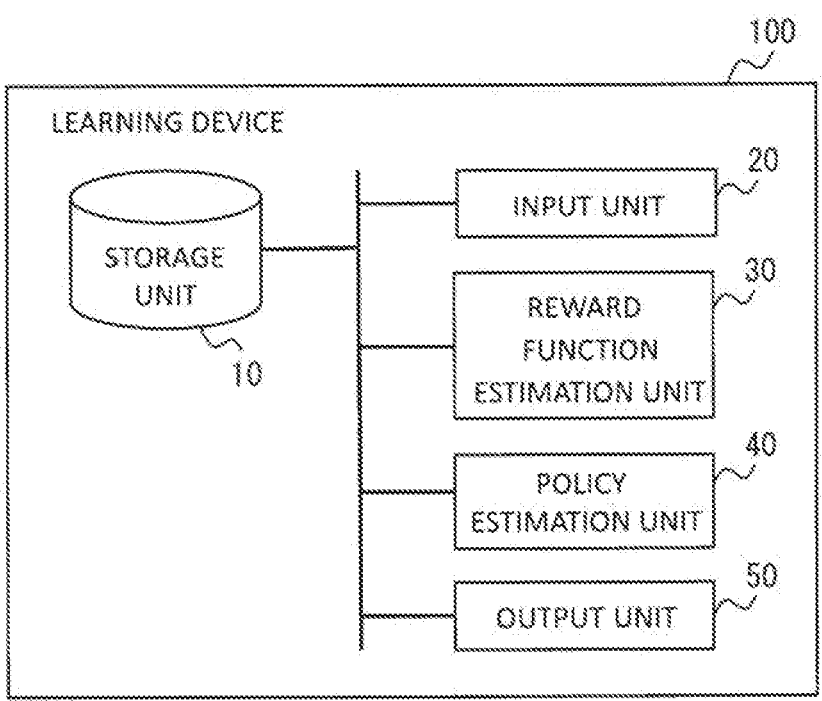
FIG. 1 It depicts a block diagram showing a configuration example of an exemplary embodiment of a learning device according to the present invention.

FIG. 1 is a block diagram showing a configuration example of an exemplary embodiment of a learning device according to the present invention. The learning device 100 of this exemplary embodiment comprises a storage unit 10, an input unit 20, a reward function estimation unit 30, a policy estimation unit 40, and an output unit 50.

The learning device 100 is a device for performing inverse reinforcement learning to estimate a reward (function) from an action of a subject, and in particular, it is a device for performing relative entropy inverse reinforcement learning that can learn a reward function without using a state transition model (i.e., model-free). An example of the subject is an expert (skilled person) in the field.

In the following, model-free inverse reinforcement learning will be described in detail. In inverse reinforcement learning, a probability model of a history (history of action a for state s) based on Feature Matching is generally introduced. Now, when the decision-making history (also called trajectory) is $\tau = S_1 a_1, \ldots, SHAH$, the reward function $r(\tau)$ can be expressed by Equation 1 below.
[Math.1]

$$r(\tau) = \sum_{s,a \in \tau} r(s, a) = \sum_{s,a \in \tau} \theta^\top f_{s,a} = \theta^\top f_\tau \qquad \text{(Equation 1)}$$

In Equation 1, r(s,a) represents a reward obtained by the action for the state. In addition, $\theta$ is a parameter to be optimized by inverse reinforcement learning, $f_\tau$ is a feature of the decision-making history (i.e., feature of trajectory), and $f_{s,a}$ is a feature for an individual decision-making.

Here, when the set of expert trajectories is $D_E$, in reverse reinforcement learning, the purpose is to find $P(\tau)$ that satisfies Equation 2 or Equation 3 below so that the following constraints representing Feature Matching is satisfied.
[Math. 2]

$$\sum_{\tau \in T} P(\tau) f_\tau \approx \hat{f}_E := \frac{1}{|D_E|} \sum_{\tau \in D_E} f_\tau$$

Specifically, in Equation 2, the purpose is to find a distribution $P(\tau)$ maximizes entropy, and in Equation 3, the purpose is to find a distribution $P(\tau)$ minimizes relative entropy. Note that Q (T) is a baseline distribution.
[Math. 3]

$$P(\tau) = \arg \max_P \{-P(\tau) \log P(\tau)\} \qquad \text{(Equation 2)}$$

$$P(\tau) = \arg \min_P P(\tau) \log \frac{P(\tau)}{Q(\tau)} \qquad \text{(Equation 3)}$$

By the method of Lagrange multiplier, when 0 is an undecided multiplier, the probability distribution in maximum entropy inverse reinforcement learning using Equation 2 shown above is expressed by Equation 4 below. The probability distribution in relative entropy inverse reinforcement learning using Equation 3 shown above is expressed by Equation 5 below.
[Math.4]

$$P(\tau|\theta) = \frac{\exp(\theta^\top f_\tau)}{\sum_{\tau \in T} \exp(\theta^\top f_\tau)} \qquad \text{(Equation 4)}$$

$$P(\tau|\theta) = \frac{Q(\tau) \exp(\theta^\top f_\tau)}{\sum_{\tau \in T} Q(\tau) \exp(\theta^\top f_\tau)} \qquad \text{(Equation 5)}$$

Equation 5, shown above is used to perform model-free inverse reinforcement learning. Specifically, the reward function can be learned in a model-free manner, by sampling from the decision-making history by random policy using Equation 5. Hereinafter, a method for learning the reward function without using the state transition model described above will be explained.

Now, when the state transition model is $D(\tau)$ and the baseline policy is Ab (T), the baseline distribution $Q(\tau)$ is represented by the product of the state transition model and the baseline policy. In other words, $Q(\tau) = D(\tau) \pi_b$ (T). The baseline policy $Tb(\tau)$ and the baseline distribution $Q(\tau)$ can be defined as follows.

$$D(\tau) = d_o(s_1) \prod_{t=1}^H p(s_{t+1} \mid s_t, a_t) \qquad \text{[Math. 5]}$$

-continued $$\pi_b(\tau) = \prod\nolimits_{t=1}^{H} \pi_b(a_t \mid s_t)$$

At this time, the update equation for the kth component of the weight vector $\theta$ of the reward function based on maximum likelihood estimation is expressed by Equation 6 below.

$$\theta_k \leftarrow \theta_k + \alpha \left\{ \frac{1}{|D_E|} \sum_{\tau \in D_E} f_{\tau,k} - \sum_{\tau \in T} P(\tau|\theta) f_{\tau,k} \right\} \qquad \text{(Equation 6)}$$

In the case of performing importance sampling, when a set of trajectories sampled by the sampling policy $\pi_s(a_t|s_t)$ is $D_{samp}$, the second term in parentheses in Equation 6 shown above can be transformed into an equation shown in Equation 7 below.

$$\frac{\sum_{\tau \in D_{samp}} \frac{D(\tau)\pi_b(\tau)}{D(\tau)\pi_s(\tau)} \exp(\theta^T f_\tau) f_{\tau,k}}{\sum_{\tau \in D_{samp}} \frac{D(\tau)\pi_b(\tau)}{D(\tau)\pi_s(\tau)} \exp(\theta^T f_\tau)} \qquad \text{(Equation 7)}$$

Then, assuming that both $\pi_s(a_t|s_t)$ and $\pi_b(a_t|s_t)$ are uniform distributions, Equation 7 above can be transformed into an equation shown in Equation 8 below.

$$\frac{\sum_{\tau \in D_{samp}} \exp(\theta^T f_\tau) f_{\tau,k}}{\sum_{\tau \in D_{samp}} \exp(\theta^T f_\tau)} \qquad \text{(Equation 8)}$$

As a result of the above process, the weight coefficient vector $\theta$ of the reward function can be updated without using the state transition model $D(\tau)$, as shown in Equations 6 and 8.

However, as described above, since relative entropy inverse reinforcement learning uses importance sampling based on random policy, the problem that the learning efficiency of the reward function deteriorates when the action space becomes high-dimensional. The reason will be explained in detail below.

When performing estimation by importance sampling based on $\pi_s(a_t|s_t)$, the second term in parentheses in Equation 6 shown above can be approximated to an equation shown in Equation 9 below.

$$\sum_{\tau \in T} P(\tau|\theta) f_{\tau,k} \approx \frac{\sum_{\tau \in D_{samp}} \frac{1}{\pi_s(\tau)} \exp(\theta^T f_\tau) f_{\tau,k}}{\sum_{\tau \in D_{samp}} \frac{1}{\pi_s(\tau)} \exp(\theta^T f_\tau)} \qquad \text{(Equation 9)}$$

Figure 2:
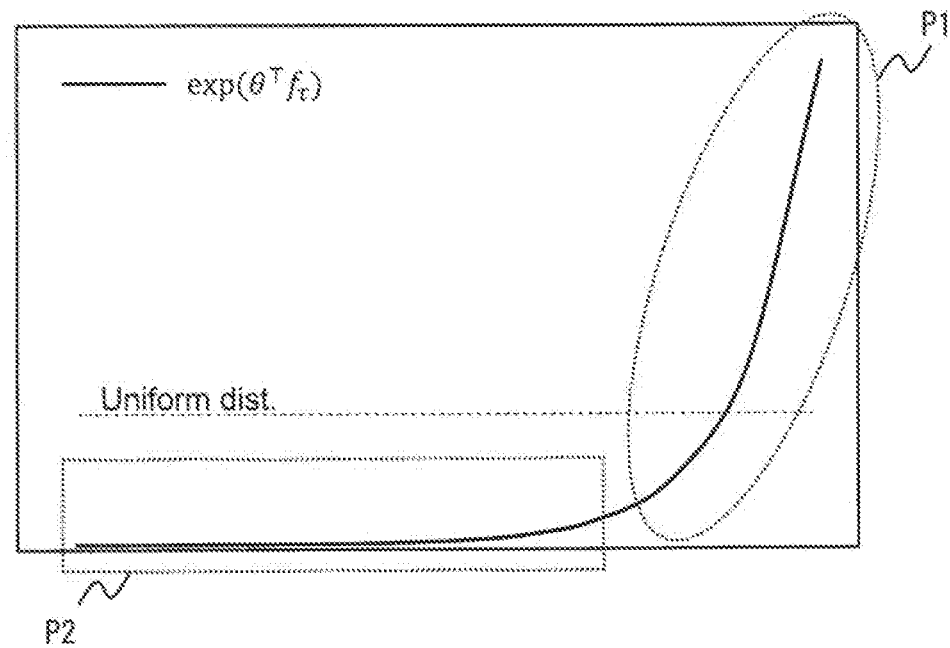
FIG. 2 It depicts an explanatory diagram showing an example of transition of a value to be calculated.

Here, focus on the denominator in Equation 9. The denominator in Equation 9 is an equation that calculates the expected value (average sum) of exp $(\theta^T f_\tau)$ by importance sampling. FIG. 2 is an explanatory diagram showing an example of transition of a value to be calculated. because exp $(\theta^T f_\tau)$ is an exponential function, the transition is shown in FIG. 2.

For efficient learning, it is desirable to be able to calculate the expected value (average sum) using samples in the part P1 illustrated in FIG. 2. However, since the sampling policy $\pi_s(\tau)$ is assumed to be a uniform distribution, even the part P2 where the values of exp $(\theta^T f_\tau)$ are small is sampled evenly. In addition, when the sampling space is high-dimensional, the possibility of being sampled from part P2 becomes even higher, and the variance of estimates in the importance sampling becomes larger.

Therefore, in this exemplary embodiment, a method capable of suppressing deterioration of learning efficiency when performing relative entropy reverse reinforcement learning will be described.

The storage unit 10 stores information necessary for the learning device 100 to perform various processes. The storage unit 10 may store various parameters used for the estimation process by the reward function estimation unit 30 and the policy estimation unit 40 described below. The storage unit 10 may also store a decision-making history of the subject received by the input unit 20 described below. The storage unit 10 is realized by a magnetic disk or the like, for example.

The input unit 20 receives an input of the decision-making history (trajectory) of the subject. For example, when learning for the purpose of automatic driving, the input unit 20 may receive the input of a large amount of driving history data based on the complex intentions of the driver as the decision-making history. Specifically, the decision-making history is represented as time-series data $\{s_t, a_t\}_{t=1}^{H}$ of combinations of the state $s_t$ at time t and the behavior at $a_t$ time t.

The reward function estimation unit 30 performs estimation by importance sampling based on the sampling policy $\pi_s(a_t|s_t)$ from the input decision-making history of the subject. In this exemplary embodiment, the sampling policy calculated by the estimated value of the reward function at each time point is used in order to prevent the variance of estimates in the importance sampling from becoming large.

Here, the sampling policy calculated using the estimated value of the reward function can be said to be the policy guided using the estimated value of the reward function at each point in time. Therefore, the sampling policy calculated (guided) using the estimated value of the reward function can be referred to as a guided sampling policy. In this exemplary embodiment, the estimation process of the reward function by the reward function estimation unit 30 and the estimation process of the guided sampling policy by the policy estimation unit 40 described below are performed alternately. Such processing is performed for the following reasons.

For example, the action of an expert should be performed in such a way that the value of the reward function is approximately maximized. Inverse reinforcement learning performs learning to obtain the reward function of the expert. Therefore, if learning by reinforcement learning or the like is performed based on the reward function in the middle of estimation, a policy to maximize the reward will be learned. And by using this policy, for example, the probability of sampling from part P1 in FIG. 2 becomes higher. Therefore, by estimating a policy using the reward function that is currently being estimated, and then replacing the estimated policy for the sampling policy and performing inverse reinforcement learning, it is expected that the sampling policy will perform more efficient sampling (sampling from part P1 in FIG. 2).

In this exemplary embodiment, in order to estimate the reward function based on the policy at each time point, the reward function estimation unit 30 estimates the reward function by multiple importance sampling. First, the reward function estimation unit 30 generates samples D of the decision-making history generated from a simulator based on the sampling policy $\pi_s(T)$. At the beginning of the process, the reward function estimation unit 30 can initialize the sampling policy $\pi_s(\tau)$ as a uniform distribution.

The reward function estimation unit 30 estimates the reward function using the generated samples $D_{samp}$ of the decision-making history, by multiple importance sampling. The multiple importance sampling method used by the reward function estimation unit 30 for estimation is arbitrary. For example, the reward function estimation unit 30 may use balanced heuristic multiple importance sampling in which a weight of each distribution is adjustable. In balanced heuristic multiple importance sampling, when the i-th sampling policy is $\pi_s^{[i]}(\tau)$ and the j-th trajectory generated from the i-th sampling policy is $\tau^{[ij]}$, the second term in parentheses in Equation 6 shown above is expressed by Equation 10 below.

$$\sum_{\tau \in T} P(\tau | \theta) f_{\tau,k} \approx \frac{\sum_i \sum_{j=1}^{|D_i|} \frac{\exp\left(\theta^\top f_{\tau[ij]}\right)}{\sum_{i'} \frac{|D_{i'}|}{|D_{samp}|} \pi_s^{[i']}\left(\tau^{[ij]}\right)} f_{\tau[ij],k}}{\sum_i \sum_{j=1}^{|D_i|} \frac{\exp\left(\theta^\top f_{\tau[ij]}\right)}{\sum_{i'} \frac{|D_{i'}|}{|D_{samp}|} \pi_s^{[i']}\left(\tau^{[ij]}\right)}} \qquad \text{(Equation 10)}$$

The reward function estimation unit 30 may estimate the reward function by updating the weight coefficient vector $\theta$ of the reward function based on the maximum likelihood estimation, as shown in Equation 6 above, for example. If there are samples of the decision-making history that have already been generated, the reward function estimation unit 30 may estimate the reward function also using the samples.

That is, the reward function estimation unit 30 may add the samples $D_{samp}$ of the decision-making history already generated based on the original sampling policy to the samples $D_i$ of decision-making history generated based on the new sampling policy, and the reward function may be estimated using the added group of samples (i.e., $D_{samp} \cup D_i$) of decision-making history. Here, i represents the number of times of repeated processing.

The policy estimation unit 40 estimates the optimal policy based on the estimated reward function. Specifically, the policy estimation unit 40 estimates the policy by solving a reinforcement learning (RL) problem using the estimated reward function or an optimal control problem (OC: Optimal Control) using the estimated reward function. Here, exp $(\theta^\top f_\tau)$ in Equation 9 can be rewritten as shown in Equation 10. Therefore, the policy estimation unit 40 may estimate the policy in order to increase a cumulative reward.

In the following description, the problem of reinforcement learning using the estimated reward function and the problem of estimating a policy by optimal control using the estimated reward function are sometimes referred to as direct problems as a term against inverse reinforcement learning.

The method by which the policy estimation unit 40 estimates a policy (method of solving the direct problem) is arbitrary, as long as it is a method (model-free method) that does not use a state transition model. The policy estimation unit 40 may estimate a policy by soft Q-learning, for example. Q-learning is a method of obtaining action value function Q (s,a) (also referred to as a Q function) which is a function that returns a cumulative reward when an action a is performed in state s. In Q-learning, a discrete value is used to indicate the action a, and the Q function is implemented by the form of a table. In addition, a Q network in which the Q function of Q-learning is represented by a deep neural network may be used.

In this exemplary embodiment, since it is sufficient to be able to estimate a more appropriate policy than the current state, the policy estimation unit 40 does not necessarily need to perform the process of updating the above Q function until convergence occurs. Therefore, the policy estimation unit 40 may terminate the process of estimating a policy before the optimal evaluation value (for example, the Q value) converges. In other words, the policy estimation unit 40 may terminate the process of estimating a policy when the evaluation value (for example, Q value) increases more than a predetermined condition. As the predetermined condition, a specific value of increase, a ratio, or the like is set.

On the other hand, in Q-learning, as described above, a discrete value is used for the value indicating the action a. In order to be able to use a continuous value for the value indicating the action a, the policy estimation unit 40 may estimate the policy by Soft Actor-Critic.

After the policy are estimated in this way, the reward function estimation unit 30 uses the estimated policy as a new sampling policy and estimates a reward function using samples of the decision-making history generated based on the new sampling policy. Thereafter, the above process is repeated until the reward function estimation unit 30 determines that the reward function has converged.

The output unit 50 outputs the estimated reward function and policy.

The input unit 20, the reward function estimation unit 30, the policy estimation unit 40, and the output unit 50 are realized by a processor (for example, CPU (Central Processing Unit), GPU (Graphics Processing Unit)) of a computer that operates according to a program (a learning program).

For example, a program may be stored in the storage unit 10 of the learning device 100, and the processor may read the program and operate as the input unit 20, the reward function estimation unit 30, the policy estimation unit 40, and the output unit 50 according to the program. In addition, the functions of the learning device 100 may be provided in the form of SaaS (Software as a Service).

The input unit 20, the reward function estimation unit 30, the policy estimation unit 40, and the output unit 50 may each be realized by dedicated hardware. Some or all of the components of each device may be realized by general-purpose or dedicated circuit, a processor, or combinations thereof. These may be configured by a single chip or by multiple chips connected through a bus. Some or all of the components of each device may be realized by a combination of the above-mentioned circuit, etc., and a program.

When some or all of the components of the learning device 100 are realized by multiple information processing devices, circuits, etc., the multiple information processing devices, circuits, etc. may be centrally located or distributed. For example, the information processing devices, circuits, etc. may be realized as a client-server system, a cloud computing system, etc., each of which is connected through a communication network.

Figure 3:
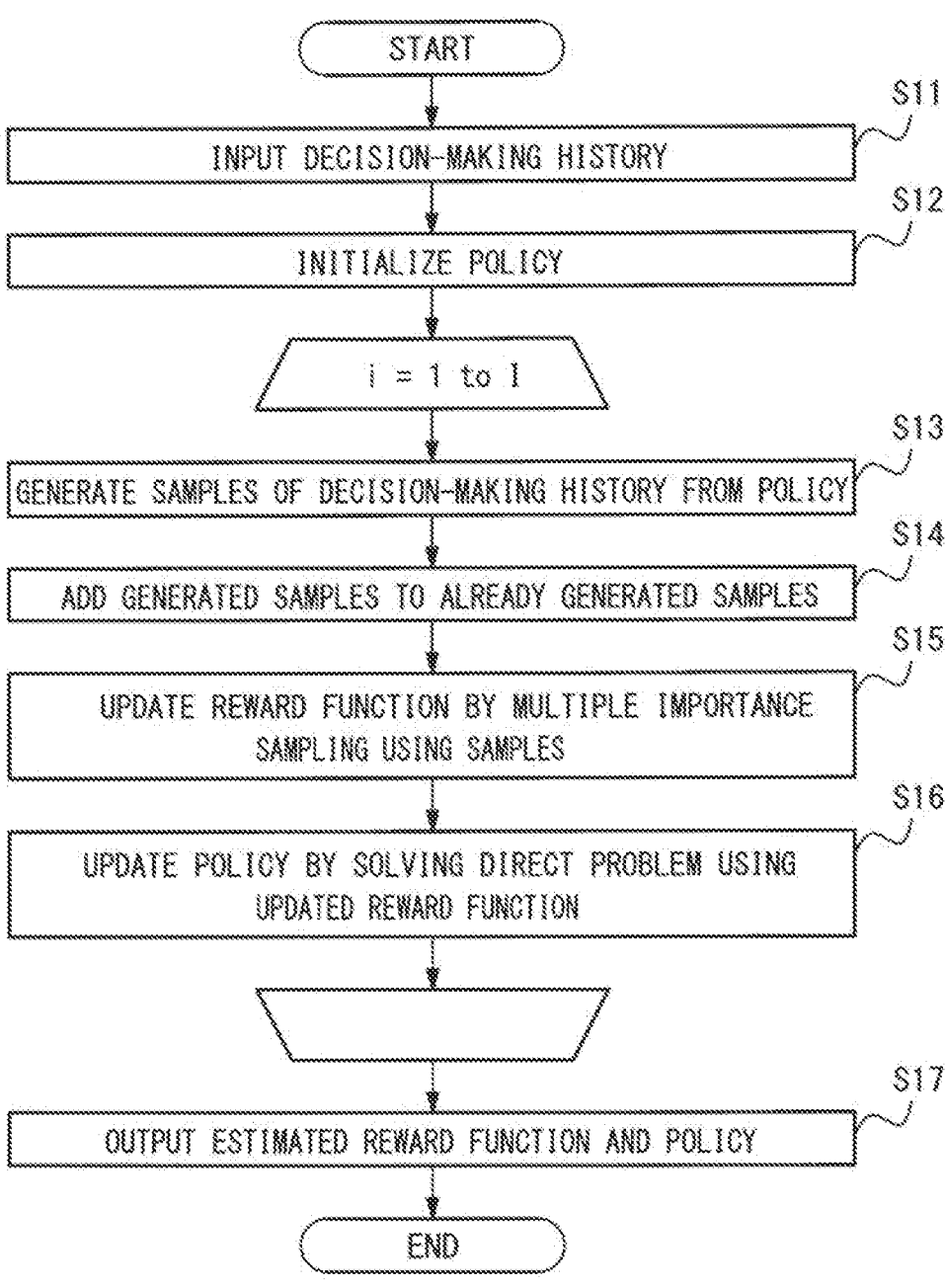
FIG. 3 It depicts an explanatory diagram showing an operation example of the learning device.

Next, the operation of the learning device 100 of this exemplary embodiment will be described. FIG. 3 is an explanatory diagram showing an operation example of the learning device 100 of this exemplary embodiment. The input unit 20 inputs the decision-making history DE of the subject (step S11). The policy estimation unit 40 initializes the policy $\pi_s(T)$ (step S12). Here, the policy estimation unit 40 initializes the policy $\pi_s(\tau)$ as a uniform distribution.

Thereafter, the processes from step S13 to step S16 are repeated until the predetermined condition is satisfied. In FIG. 3, the number of repetitions will be described as I.

The reward function estimation unit 30 generates samples $D_i$ of the decision-making history from the policy $\pi_s(T)$ (step S13). The reward function estimation unit 30 adds the generated samples $D_i$ to the already generated samples $D_{samp}$ (step S14). The reward function estimation unit 30 updates the reward function θ by multiple importance sampling using the added samples $D_{samp}$ (step S15). Then, the policy estimation unit 40 updates the policy $\pi_s(T)$ by solving the direct problem using the updated reward function θ (step S16). Then, the output unit 50 outputs the estimated reward function θ and policy $\pi_s(T)$ (step S17).

Since FIG. 3 shows the process of sequentially estimating the guided sampling policy in the framework of relative entropy inverse reinforcement learning, the algorithm illustrated in FIG. 3 can be referred to as the guided relative entropy inverse reinforcement learning algorithm.

Figure 4:
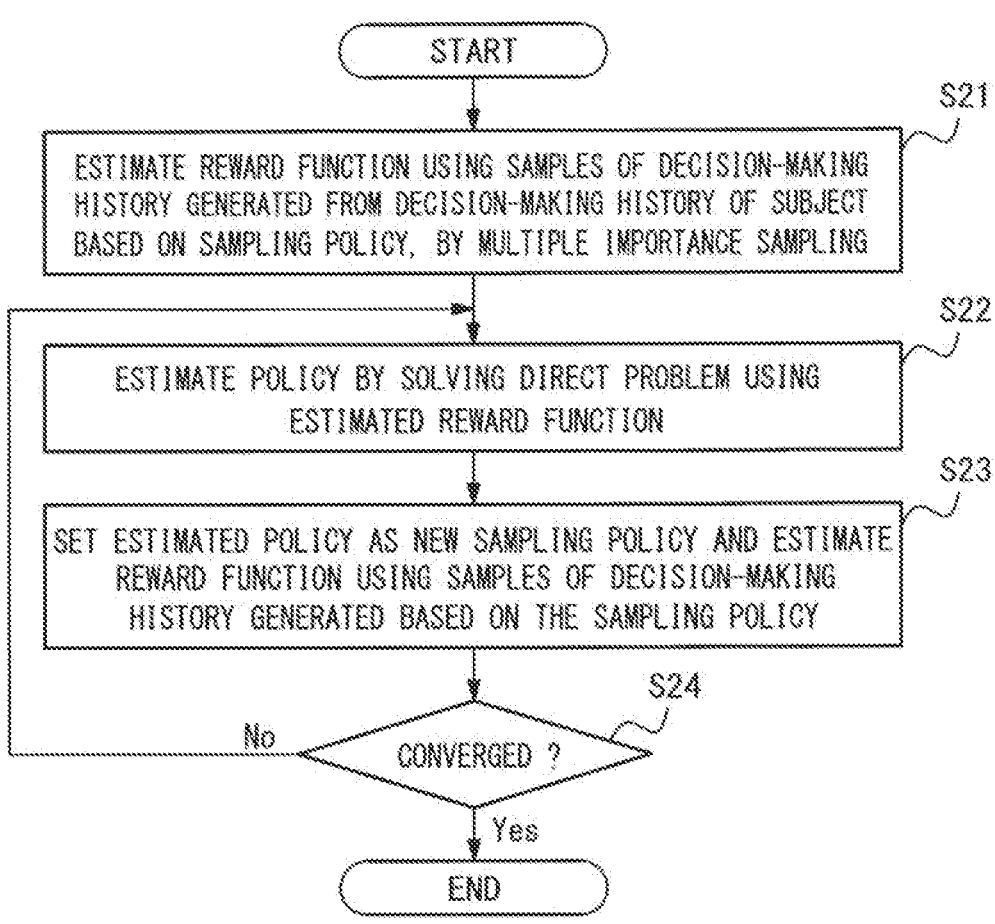
FIG. 4 It depicts an explanatory diagram showing another operation example of the learning device.

FIG. 4 is an explanatory diagram showing another operation example of the learning device. 100 of this exemplary embodiment. The reward function estimation unit 30 estimates a reward function using samples of a decision-making history generated from the decision-making history of the subject based on the sampling policy, by multiple importance sampling (step S21). The policy estimation unit 40 estimates the policy by solving a direct problem using the estimated reward function (step S22). Then, the reward function estimation unit 30 sets the estimated policy as a new sampling policy and estimates a reward function using samples of the decision-making history generated based on the sampling policy (step S23). Thereafter, when the reward function has converged (Yes in step S24), the process is terminated, and when the reward function has not converged (No in step S24), the process of step S22 and step S23 are repeated.

As described above, in this exemplary embodiment, the reward function estimation unit estimates a reward function by multiple importance sampling using samples of the decision-making history of the subject and of the decision-making history generated based on the sampling policy, and the policy estimation unit 40 estimates a policy by reinforcement learning using the estimated reward function. Then, the reward function estimation unit 30 sets the policy estimated by the policy estimation unit as a new sampling policy, and estimates the reward function by multiple importance sampling using the decision-making history of the subject and samples of the decision-making history generated based on that sampling policy. Therefore, it is possible to suppress deterioration of learning efficiency when performing relative entropy inverse reinforcement learning.

Figure 5:
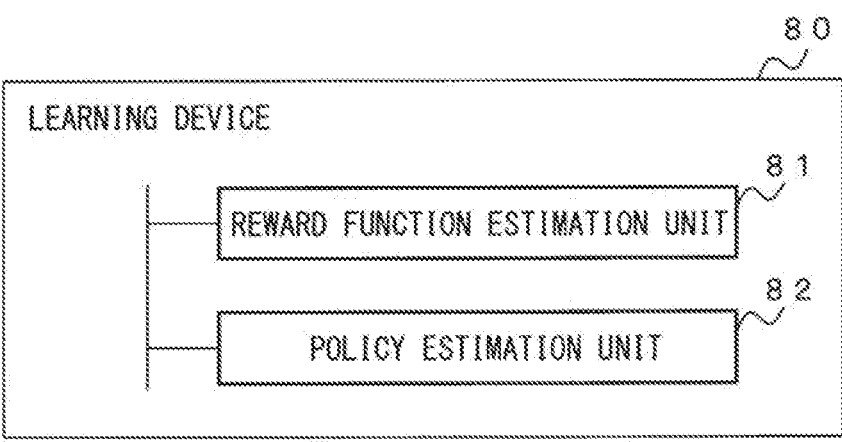
FIG. 5 It depicts a block diagram showing a summarized learning device according to the present invention.

Next, an overview of the present invention will be explained. FIG. 5 is a block diagram showing a summarized learning device according to the present invention. The learning device 80 according to the present invention comprises a reward function estimation unit 81 (for example, the reward function estimation unit 30) which estimates a reward function (for example, θ) by multiple importance sampling using samples (for example, $D_{samp}$) of a decision-making history (for example, $D_E$) of a subject (for example, an expert) and of a decision-making history generated based on a sampling policy (for example, $\pi_s(\tau)$), and a policy estimation unit 82 (for example, the policy estimation unit 40) which estimates a policy by reinforcement learning using the estimated reward function.

The reward function estimation unit 81 sets the policy estimated by the policy estimation unit as a new sampling policy, and estimates the reward function by the multiple importance sampling using the samples (for example, $D_i \cup D_{samp}$) of the decision-making history of the subject and of the decision-making history generated based on the sampling policy.

By such a configuration, it is possible to suppress deterioration of learning efficiency when performing relative entropy inverse reinforcement learning.

In this regard, the policy estimation unit 82 may estimate the policy which increases a cumulative reward obtained from the estimated reward function.

The policy estimation unit 82 may terminate a process of estimating the policy when an evaluation value (for example, Q value) increases more than a predetermined condition. In this way, the efficiency of learning can be improved because the policy need not be optimized until convergence occurs.

The reward function estimation unit 81 may also add samples (for example, Di) of the decision-making history generated based on the new sampling policy to the samples (for example, $D_{samp}$) of the decision-making history already generated based on an original sampling policy, and estimates the reward function using a group of samples (for example, $D_i \cup D_{samp}$) including the added samples. By such a configuration, it is possible to reduce the variance.

Specifically, the reward function estimation unit 81 may estimate the reward function by updating a weight coefficient vector of the reward function (for example, using Equation 6 shown above) based on maximum likelihood estimation.

The policy estimation unit 82 can determine the policy by the reinforcement learning without using a state transition model (i.e., model-free).

The policy estimation unit 82 may estimate the policy by soft Q-learning (for example, when the value indicating the action is a discrete value) or Soft Actor-Critic (for example, when the value indicating the action is a continuous value).

The reward function estimation unit 81 may also estimate the reward function by balanced heuristic multiple importance sampling.

Figure 6:
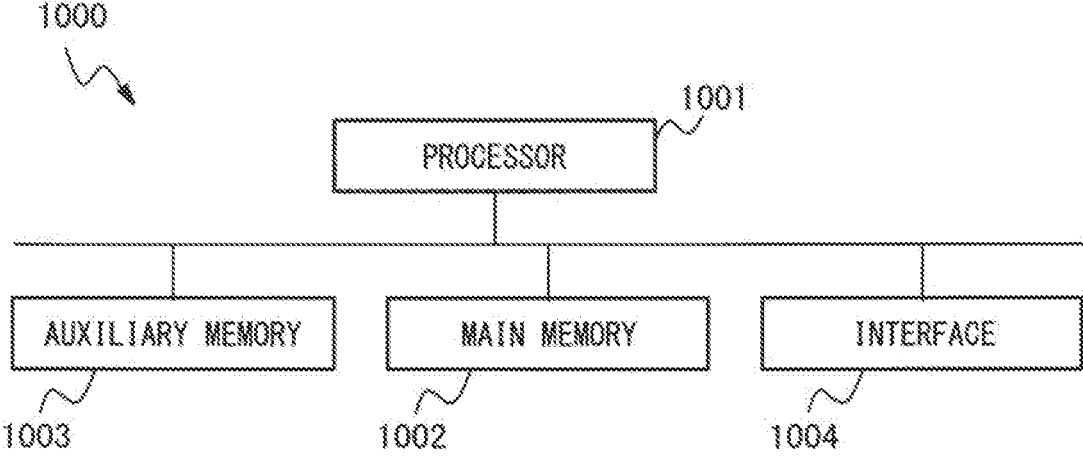
FIG. 6 It depicts a summarized block diagram showing a configuration of a computer for at least one exemplary embodiment.

FIG. 6 is a summarized block diagram showing a configuration of a computer for at least one exemplary embodiment. The computer 1000 comprises a processor 1001, a main memory 1002, an auxiliary memory 1003, and an interface 1004.

The learning device 100 described above are implemented in the computer 1000. The operation of each of the above mentioned processing units is stored in the auxiliary memory 1003 in a form of a program (learning program). The operations of each of the above-mentioned processing units are stored in the auxiliary storage 1003 in the form of programs (intention feature extraction program and learning program). The processor 1001 reads the program from the auxiliary memory 1003, deploys the program to the main memory 1002, and implements the above described processing in accordance with the program.

In at least one exemplary embodiment, the auxiliary memory 1003 is an example of a non-transitory tangible medium. Other examples of non-transitory tangible media include a magnetic disk, an optical magnetic disk, a CD-ROM (Compact Disc Read only memory), a DVD-ROM (Read-only memory), a semiconductor memory, and the like. When the program is transmitted to the computer 1000 through a communication line, the computer 1000 receiving the transmission may deploy the program to the main memory 1002 and perform the above process.

The program may also be one for realizing some of the aforementioned functions. Furthermore, said program may be a so-called differential file (differential program), which realizes the aforementioned functions in combination with other programs already stored in the auxiliary memory 1003.

A part of or all of the above exemplary embodiments may also be described as, but not limited to, the following supplementary notes.

(Supplementary note 1) A learning device comprising:
a reward function estimation unit which estimates a reward function by multiple importance sampling using samples of a decision-making history of a subject and of a decision-making history generated based on a sampling policy; and
a policy estimation unit which estimates a policy by reinforcement learning using the estimated reward function, wherein
the reward function estimation unit sets the policy estimated by the policy estimation unit as a new sampling policy, and estimates the reward function by the multiple importance sampling using the samples of the decision-making history of the subject and of the decision-making history generated based on the sampling policy.

(Supplementary note 2) The learning device according to Supplementary note 1, wherein
the policy estimation unit estimates the policy which increases a cumulative reward obtained from the estimated reward function.

(Supplementary note 3) The learning device according to Supplementary note 1 or 2, wherein
the policy estimation unit terminates a process of estimating the policy when an evaluation value increases more than a predetermined condition.

(Supplementary note 4) The learning device according to any one of Supplementary notes 1 to 3, wherein
the reward function estimation unit adds samples of the decision-making history generated based on the new sampling policy to the samples of the decision-making history already generated based on an original sampling policy, and estimates the reward function using a group of samples including the added samples.

(Supplementary note 5) The learning device according to any one of Supplementary notes 1 to 4, wherein
the reward function estimation unit estimates the reward function by updating a weight coefficient vector of the reward function based on maximum likelihood estimation.

(Supplementary note 6) The learning device according to any one of Supplementary notes 1 to 5, wherein
the reward function estimation unit determines the policy by the reinforcement learning without using a state transition model.

(Supplementary note 7) The learning device according to any one of Supplementary notes 1 to 6, wherein
the reward function estimation unit estimates the policy by soft Q-learning or Soft Actor-Critic.

(Supplementary note 8) The learning device according to any one of Supplementary notes 1 to 7, wherein
the reward function estimation unit estimates the reward function by balanced heuristic multiple importance sampling.

(Supplementary note 9) A learning method comprising:
estimating a reward function by multiple importance sampling using samples of a decision-making history of a subject and of a decision-making history generated based on a sampling policy;

12 estimating a policy by reinforcement learning using the estimated reward function; and
setting the estimated policy as a new sampling policy, and estimates the reward function by the multiple importance sampling using the samples of the decision-making history of the subject and of the decision-making history generated based on the sampling policy.

(Supplementary note 10) The learning method according to Supplementary note 9, wherein
the policy which increases a cumulative reward obtained from the estimated reward function is estimated.

(Supplementary note 11) A learning program causing a computer to execute:
a reward function estimation process of estimating a reward function by multiple importance sampling using samples of a decision-making history of a subject and of a decision-making history generated based on a sampling policy; and
a policy estimation process of estimating a policy by reinforcement learning using the estimated reward function,
wherein the learning program causes the computer to set the policy estimated in the policy estimation process as a new sampling policy, and estimate the reward function by the multiple importance sampling using the samples of the decision-making history of the subject and of the decision-making history generated based on the sampling policy, in the reward function estimation process.

(Supplementary note 12) The learning program according to Supplementary note 11, wherein
the learning program causes the computer to execute estimating the policy which increases a cumulative reward obtained from the estimated reward function, in the reward function estimation process.

REFERENCE SIGNS LIST

10 Storage unit
20 Input unit
30 Reward function estimation unit
40 Policy estimation unit
50 Output unit

What is claimed is:
1. A learning device comprising:
a memory storing instructions; and
one or more processors configured to execute the instructions to:
repeatedly perform a learning cycle until a predefined convergence condition is met, wherein the learning cycle comprises:
estimating a reward function by applying a balanced-heuristic multiple importance sampling (BH-MIS) to an aggregated group of samples stored in the memory, wherein the aggregated group of samples comprises a plurality of trajectories, each of the plurality of trajectories comprising a history of system states and actions, and being associated with an identifier of a sampling policy used to generate the corresponding trajectory of the plurality of trajectories, and having a weight used for BH-MIS; and
wherein the applying the BH-MIS comprises updating the corresponding weight of each of the plurality of trajectories in a balanced manner based on information associated with the corresponding sampling policy;

estimating a guided sampling policy by performing reinforcement learning using the estimated reward function, to generate an action output for a simulator or an actual machine;

generating a new trajectory by applying the guided sampling policy to the simulator or the actual machine; and adding the new trajectory to the aggregated group of samples, the new trajectory being associated with an identifier of the guided sampling policy used to generate the new trajectory, wherein the one or more processors are further configured to execute the instructions to:

add, to samples of the corresponding histories of system states and actions of the plurality of trajectories already generated based on an original sampling policy, samples of the corresponding histories of system states and actions generated based on the guided sampling policy; and estimate the reward function using a group of samples including the added samples.

2. The learning device according to claim 1, wherein the one or more processors are further configured to execute the instructions to:

estimate a policy which increases a cumulative reward obtained from the estimated reward function.

3. The learning device according to claim 1, wherein the one or more processors are further configured to execute the instructions to:

terminate a process of estimating a policy when an evaluation value increases more than a predetermined condition.

4. The learning device according to claim 1, wherein the one or more processors are further configured to execute the instructions to:

estimate the reward function by updating a weight coefficient vector of the reward function based on maximum likelihood estimation.

5. The learning device according to claim 1, wherein the one or more processors are further configured to execute the instructions to: determine a policy by the reinforcement learning without using a state transition model.

6. The learning device according to claim 1, wherein the one or more processors are further configured to execute the instructions to:

estimate a policy by soft Q-learning or Soft Actor-Critic.

7. The learning device according to claim 1, wherein the one or more processors are further configured to execute the instructions to:

estimate the reward function by balanced heuristic multiple importance sampling.

8. A learning method comprising:

repeatedly performing a learning cycle until a predefined convergence condition is met, wherein the learning cycle comprises:

estimating a reward function by applying a balanced-heuristic multiple importance sampling (BH-MIS) to an aggregated group of samples stored in a memory, wherein the aggregated group of samples comprises a plurality of trajectories, each of the plurality of trajectories comprising a history of system states and actions, and being associated with an identifier of a sampling policy used to generate the corresponding trajectory of the plurality of trajectories, and having a weight used for BH-MIS; and wherein the applying the BH-MIS comprises updating the corresponding weight of each of the plurality of trajectories in a balanced manner based on information associated with the corresponding sampling policy;

estimating a guided sampling policy by performing reinforcement learning using the estimated reward function, to generate an action output for a simulator or an actual machine;

generating a new trajectory by applying the guided sampling policy to the simulator or the actual machine; and adding the new trajectory to the aggregated group of samples, the new trajectory being associated with an identifier of the guided sampling policy used to generate the new trajectory, wherein the learning method further comprises:

adding, to samples of the corresponding histories of system states and actions of the plurality of trajectories already generated based on an original sampling policy, samples of the corresponding histories of system states and actions generated based on the guided sampling policy; and estimating the reward function using a group of samples including the added samples.

9. The learning method according to claim 8, further comprising:

estimating a policy which increases a cumulative reward obtained from the estimated reward function.

10. A non-transitory computer readable information recording medium storing a learning program which, when executed by at least one processor, causes the at least one processor to perform a method comprising:

repeatedly performing a learning cycle until a predefined convergence condition is met, wherein the learning cycle comprises:

estimating a reward function by applying a balanced-heuristic multiple importance sampling (BH-MIS) to an aggregated group of samples stored in a memory, wherein the aggregated group of samples comprises a plurality of trajectories, each of the plurality of trajectories comprising a history of system states and actions, and being associated with an identifier of a sampling policy used to generate the corresponding trajectory of the plurality of trajectories, and having a weight used for BH-MIS; and wherein the applying the BH-MIS comprises updating the corresponding weight of each of the plurality of trajectories in a balanced manner based on information associated with the corresponding sampling policy;

estimating a guided sampling policy by performing reinforcement learning using the estimated reward function, to generate an action output for a simulator or an actual machine;

generating a new trajectory by applying the guided sampling policy to the simulator or the actual machine; and adding the new trajectory to the aggregated group of samples, the new trajectory being associated with an identifier of the guided sampling policy used to generate the new trajectory, wherein the method further comprises:

adding, to samples of the corresponding histories of system states and actions of the plurality of trajectories already generated based on an original sampling policy, samples of the corresponding histories of system states and actions generated based on the guided sampling policy; and estimating the reward function using a group of samples including the added samples.

11. The non-transitory computer readable information recording medium according to claim 10, the method further comprising:

estimating a policy which increases a cumulative reward obtained from the estimated reward function.

\* \* \* \* \*